United States Patent [19]

Igashira et al.

[11] 4,356,804
[45] Nov. 2, 1982

[54] FUEL EVAPORATOR

[75] Inventors: Toshihiko Igashira, Toyokawa; Ken Nomura, Okazaki; Seiko Abe, Kariya, all of Japan

[73] Assignee: Nippon Soken, Inc., Nishio, Japan

[21] Appl. No.: 177,799

[22] Filed: Aug. 13, 1980

[30] Foreign Application Priority Data

Aug. 17, 1979 [JP] Japan .................... 54/113959[U]
May 12, 1980 [JP] Japan .................... 55/64721[U]

[51] Int. Cl.³ .................................... F02M 31/00
[52] U.S. Cl. .................................. 123/549; 123/548; 123/552; 261/142; 219/206
[58] Field of Search ............. 123/552, 548, 549, 547; 261/142; 219/206, 207

[56] References Cited

U.S. PATENT DOCUMENTS

| | | | |
|---|---|---|---|
| 3,898,422 | 8/1975 | Fuller | 123/549 |
| 3,987,772 | 10/1976 | McBride | 123/549 |
| 4,108,125 | 8/1978 | Marcousix | 123/549 |
| 4,177,778 | 12/1979 | Naitou | 123/549 |
| 4,242,999 | 1/1981 | Hoser | 123/548 |
| 4,246,880 | 1/1981 | Henke | 123/548 |
| 4,279,234 | 7/1981 | Marcoux | 123/549 |

Primary Examiner—Ronald H. Lazarus
Attorney, Agent, or Firm—Cushman, Darby & Cushman

[57] ABSTRACT

A fuel evaporator for an internal combustion engine is comprised of a metallic casing which is composed of a heating plate portion and a supporting portion projecting from the outer periphery of the heating plate portion downward, a heating element fixed to the heating plate portion within the casing, an insulating and adiabatic covering member which covers the supporting portion and an electrically connecting means which connects the heating element and a battery.

The supporting portion of the casing is inserted in a hole formed in an intake pipe so that the heating plate portion is exposed therewithin.

Since the supporting portion of the casing is covered with the insulating and adiabatic covering member, very little of the heat of the heating element is dissipated from the supporting portion into the intake pipe.

By forming the supporting portion into a plurality of strip shaped legs, the heat escaping therefrom can be further reduced.

9 Claims, 6 Drawing Figures

FUEL EVAPORATOR

BACKGROUND OF THE PRESENT INVENTION

The present invention relates to a fuel evaporator for promoting the vaporization of the fuel contained in the intake mixture of an internal combustion engine of a vehicle such as an automobile.

Ceramic material such as barium titanate (hereinafter will be called PTC ceramic) has such characteristics that when electrified, it generates heat and when the temperature thereof reaches a specific value called the Curie temperature, the electric resistance thereof increases rapidly.

Under the Curie temperature, the PTC ceramic receives a large amount of electric current to reach the Curie temperature rapidly.

Over the Curie temperature, the electric resistance becomes remarkably large and the PTC ceramic receives only a small amount of electric current. Therefore, the PTC ceramic is not overheated. Thus, the PTC ceramic adjusts the temperature thereof by itself into about the Curie temperature, that is about 120° C. to 150° C.

Since this temperature range is suitable for promoting the vaporization of the fuel contained within the intake mixture of the internal combustion engine, the PTC ceramic has been employed as a heating means of a heater portion disposed directly under a throttle valve within an intake pipe.

In the conventional fuel evaporator using the PTC ceramic as a heating element, the PTC ceramic is accomodated within a casing made of a heat conductive metallic plate and the casing is disposed in a hole formed in the wall of the intake pipe directly under the throttle valve.

In this case, one portion of the casing is exposed to the interior of the intake pipe to form a heating plate portion. To the reverse surface of the heating plate portion, a heating element is closely fixed. A cylindrical supporting portion of the casing, which is continued from the heating plate portion, is closely inserted within the hole of the intake pipe and fixed thereto.

The heating plate portion of the casing is required to instantaneously evaporate the fuel droplets which collide against the heating plate portion. In order to satisfy the above requirement, the temperature of the heating plate portion must be kept over 80° C., preferably 100° C. to 120° C.

The above described PTC ceramic itself has such a characteristics as to satisfy this temperature condition. But from the heating plate portion to which heat is transmitted from the heating element, heat is taken away by the fuel droplets colliding thereagainst. Furthermore, heat escapes from the supporting portion of the casing to the intake pipe which is contacted with the casing. Also, since the temperature of the coolant for the engine which is introduced in the wall of the intake pipe in order to heat the intake mixture is low at an engine starting time, the heat of the casing is taken away by the coolant through the intake pipe.

Therefore, the temperature of the heating plate portion does not rise as desired.

In order to make the temperature of the heating plate portion rise rapidly and to keep the temperature thereof at a temperature above 80° C., it was proposed to form the heating plate portion of a metallic plate and to form the supporting portion of an adiabatic material such as a synthetic resin, ceramic, etc. However, the strength of synthetic resin and ceramic is generally smaller than that of metal. When a strong attracting force is applied to the heating plate portion due to the intake pipe negative pressure, the synthetic resin and ceramic of the supporting portion which is fixed to the intake pipe are in danger of being broken.

Furthermore, when the supporting portion is formed of ceramic or synthetic resin, it is impossible to ground the electric current to the intake pipe through the supporting portion and then a complex ground system is required.

Accordingly, an object of the present invention is to provide a fuel evaporator wherein the heat of the heating element made of PTC ceramic is effectively transmitted to the heating plate portion with hardly any heat escaping from the heating plate portion to the intake pipe.

Another object of the present invention is to provide a fuel evaporator which is not broken when subjected to the intake pipe negative pressure or the vibrations and has excellent durability.

Still another object of the present invention is to provide a fuel evaporator having a simple electrifying structure of the heating element made of PTC ceramic.

DESCRIPTION OF THE DRAWINGS

Other objects and advantages of the invention will become apparent from the following description of embodiments with reference to the accompanying drawings wherein.

DETAILED DESCRIPTION OF THE PRESENT INVENTION

Hereinafter, the embodiments of the present invention will be explained in detail with reference to the drawings.

Figure 1:
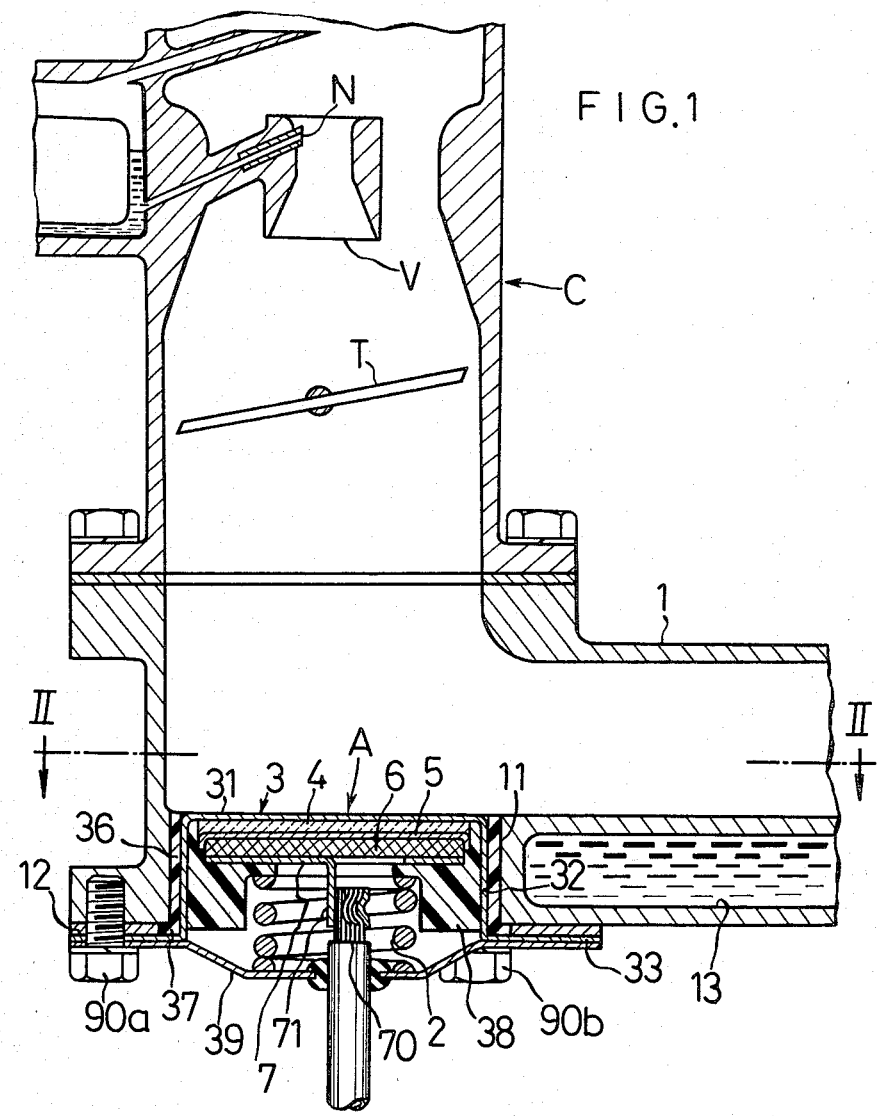
FIG. 1 is a longitudinal sectional view of a fuel evaporator of a first embodiment of the present invention.
Figure 2:
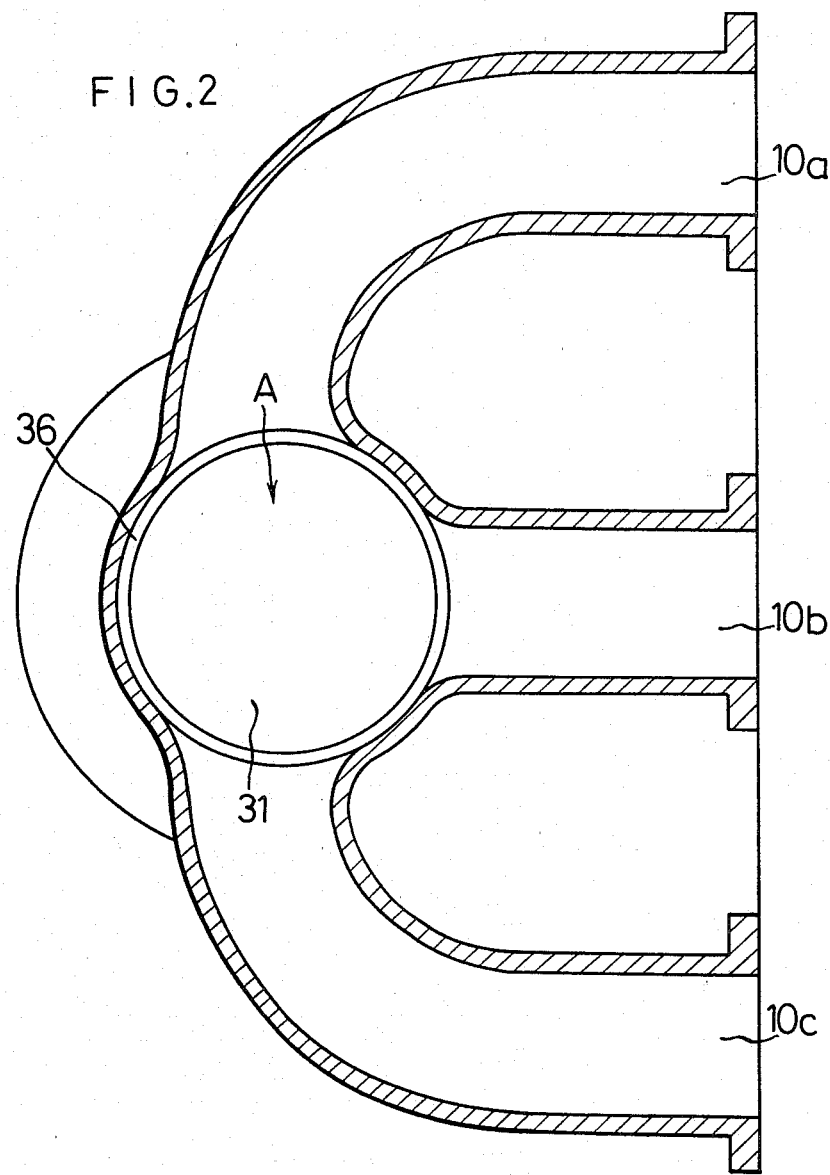
FIG. 2 is a cross sectional view taken along the line II—II of FIG. 1.

In the first embodiment shown in FIG. 1 and FIG. 2, a carburetor C is disposed in the upper stream of an intake pipe (an intake manifold) 1 of an internal combustion engine. The gasoline fuel which is supplied from a fuel supplying nozzle N which opens in a venturi portion V is mixed with the intake air and is supplied to a combustion chamber (not shown) of the engine by way of the intake pipe 1 through a throttle valve T.

In a wall of a bent portion of the intake pipe 1 wherein the intake pipe 1 is diverged into intake branch pipes 10a, 10b and 10c, a circular hole 11 is perforated directly under the throttle valve T. And a fuel evaporating device A is disposed in the circular hole 11.

A casing 3 of the device A is composed of a circular plate-shaped heating plate portion 31, a cylindrical supporting portion 32 which projects from the periphery of the heating plate portion 31 in a direction perpendicular thereto and an annular flange portion 33 which projects from the lower end of the supporting portion 32 outwardly.

These portions 31, 32 and 33 are integrally formed of an aluminum plate. The outer peripheral surface of the supporting portion 32 is covered with a cylindrical adiabatic member 36. A lower end of the adiabatic member 36 is formed into an annular flange portion 37 which projects outwardly. The width of the annular flange portion 37 is made narrower than that of the flange portion 33. The adiabatic member 36 is formed of ceramic, synthetic resin, rubber or the like. Particularly, an electrically insulated, heat resistant and gasoline resistant material such as fluoric rubber and fluoric resin is preferable.

The supporting portion 32 of the casing 3 is tightly fitted within the hole 11 formed in the intake pipe 1, and covered with the adiabatic member 36.

The casing 3 is fixed to the intake pipe 1 by means of bolts 90a, 90b and the like in the flange portion 33 thereof through the outer periphery of a bottom plate 39 which is disposed to cover the opening of the casing 3. Between the flange portion 33 of the casing 3 and the intake pipe 1, the flange 37 of the adiabatic member 36 and a ring shaped gasket 12 are interposed.

Within the casing 3, a coil spring 2 is attached on the bottom plate 39 and supports a heating element 4 through an electric insulating member 38, an electrode plate 7, a cushion member 6, and an electrode plate 5. The coil spring 2 presses the heating element 4 against the under surface of the heating plate portion 31 by the spring force thereof.

The electric insulating member 38 is made of synthetic resin and shaped into a cylindrical body provided with a flange portion projecting inwardly from the upper end thereof.

The electrode plate 7 which is in contact with the electric insulating member 38 is a copper plate. The central portion thereof is cut and bent downwards to form an electrode terminal 71. The electrode plate 7 is connected to an anode terminal (not shown) of a battery (not shown) through a lead wire 70 and and a key switch.

The cushion member 6 is made of stainless steel wool which is produced by knitting fine stainless steel wire and is formed into a circular plate shape. The electrode plate 5 which is disposed on the cushion member 6 so as to cover it is shaped like a saucer and is made of a thin aluminum plate.

The heating element 4 which is closely interposed between the heating plate portion 31 and the electrode plate 5 is shaped like a circular plate and is composed of a sintered body containing barium titanate as a main ingredient. The heating element 4 has a positive temperature coefficient of resistance and a specific Curie temperature. When electrified, the heating element 4 generates heat. In the upper and under surfaces of the heating element 4, silver paste as an electrode material is plated.

The intake branch pipes 10a, 10b and 10c are provided with a water jacket 13 wherein the coolant is circulated.

In the fuel evaporator A as described above, the temperature within the intake pipe 1 is substantially equal to that of the atmosphere at an engine starting time.

When the internal combustion engine is started by closing the key switch, the electric current supplied from the battery flows in the order of the battery anode, the lead wire 70, the electrode plate 7, the cushion member 6, the electrode plate 5, the heating element 4, the heating plate portion 31 of the casing 3, the supporting portion 32, the flange 33, the bolts 90a, 90b and the like, the intake pipe 1, and the battery cathode.

At this time, the temperature of the heating element 4 rises to about 150° C. instantaneously and thereafter the temperature thereof is kept at about 150° C.

The heat is transmitted from the heating element 4 to the heating plate portion 31.

The unevaporated fuel droplets which flow within the intake pipe 1 together with the intake mixture make contact with the heating plate portion 31 and are heated until evaporation at a cold starting time of the engine.

In the first embodiment, the flange portion 37 is provided in the lower end of the adiabatic member 36 covering the outer periphery of the supporting portion 32 of the casing 3. The flange portion 37 and the flange portion 33 which is formed in the lower end of the supporting member 32 are secured to the intake pipe 1 to prevent the fuel evaporator from coming out of the wall of the intake pipe 1 due to the intake pipe negative pressure.

Figure 3:
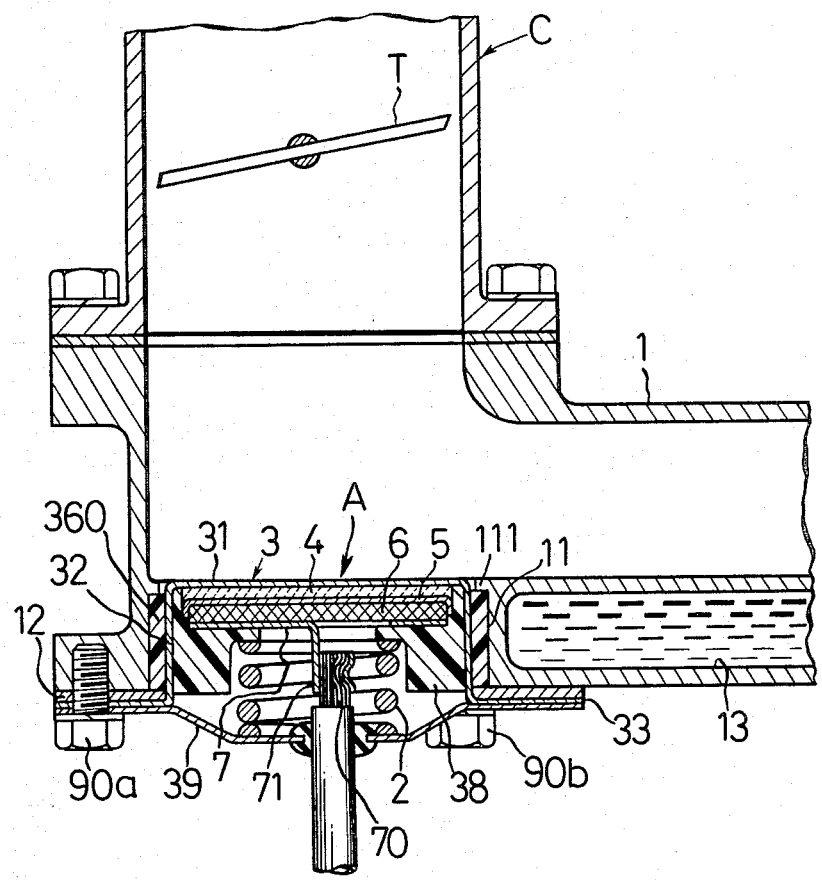
FIG. 3 is a longitudinal sectional view of a second embodiment.

In the second embodiment of the present invention as shown in FIG. 3, a cylindrical adiabatic member 360 which is not provided with a flange portion is used. In this case, projecting portion 111 is formed in the whole circumference of the opening of the hole 11 facing the intake pipe 1 to engage the upper end of the adiabatic member 360 and prevent the fuel evaporator from coming out of the wall of the intake pipe 1.

The other structure of the second embodiment is the same as that of the first embodiment.

As described above, the fuel evaporator of the first and the second embodiments of the present invention has high strength since the casing thereof is made by integrally forming the heating plate portion, the supporting portion and the flange portion of a metallic plate.

By covering the outer periphery of the supporting portion of the casing with the adiabatic member and interposing the adiabatic member between the casing and the intake pipe wall, the heat of the casing can be prevented from escaping into the intake pipe wall and the water jacket formed in the intake pipe wall. As a result, heating efficiency of the heating plate portion can be improved.

The electric construction of the fuel evaporator of the present invention can be made simple since the electric current is grounded to the intake pipe 1 through the supporting portion and the bolts.

Furthermore, since the casing and the adiabatic member disposed in the outer periphery thereof are firmly fixed to the intake pipe, the casing and the adiabatic member do not come out of the wall of the intake pipe when subjected to the negative pressure thereof.

Figure 4:
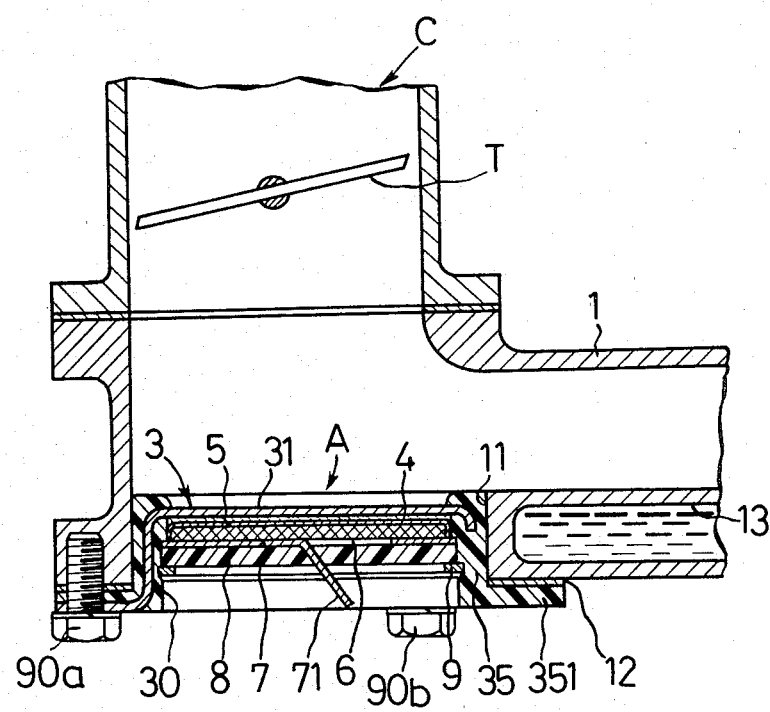
FIG. 4 is a longitudinal sectional view of a third embodiment.

In the third embodiment as shown in FIG. 4, the casing 3 of the fuel evaporator A is composed of a circular heating plate portion 31, and a supporting portion 30 consisting of three legs 30a, 30b and 30c (not shown) which project from the peripheral portion of the heating plate portion 31 downward, respectively. The heating plate portion 31 and the supporting portion 30 are integrally formed of a thin walled aluminum plate.

The supporting portion 30 is buried within a cylindrical adiabatic covering member 35 which is made of synthetic resin or ceramic.

Figure 5:
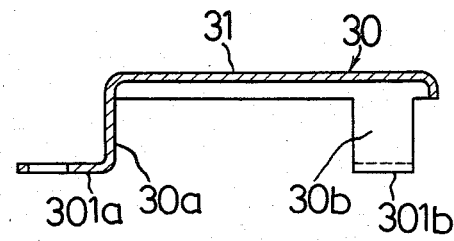
FIG. 5 is a longitudinal sectional view of a casing used in the third embodiment.

FIG. 5 shows the supporting portion 30 provided with legs 30a, 30b and 30c (not shown).

In each of the legs 30a, 30b and 30c, flange portions 301a, 301b and 301c (not shown) are formed, respectively. The bottom surface of each of the legs is exposed to the outside from the flange portion 351 which is formed in the lower end of the covering member 35.

In the fuel evaporator of the third embodiment, the heating plate portion 31, the heating element 4, the electrode plate 5, the cushion member 6, the electrode plate 7 and the electrode terminal 71 have the same structure as those of the first and the second embodiments and are disposed in the same manner as that of the first and the second embodiments.

The under surface of the electrode plate 7 is supported by a stay 8 made of slightly thicker electric insulating resin. The stay 8 is pushed up and supporting by a circular clip 9 which is inserted in a groove provided in the inner periphery of the covering member 35. Through the central portion of the stay 8, the electrode terminal 71 penetrates.

The covering member 35 wherein the legs 30a, 30b and 30c are buried, is tightly fitted within a hole 11 of the intake pipe 1. The covering member 35 is fixed to the intake pipe 1 together with the flange portions 301a, 301b and 301c of the legs 30a, 30b and 30c by means of bolts 90a, 90b and 90c (not shown), respectively, or the like in the flange portion 351 thereof. The flange portions 301a, 301b and 301c of the legs 30a, 30b and 30c are in contact with the intake pipe 1 through the bolts 90a, 90b and 90c (not shown).

Between the flange portion 351 of the covering member 35 and the intake pipe 1 which are joined to each other, a gasket 12 is interposed. In the intake pipe 1, a water jacket 13 is provided for circulating the engine coolant.

When the key switch is closed in order to start the engine, electric current flows in the order of the battery anode, the electric plate 7, the cushion member 6, the electrode plate 5, the heating element 4, the heating plate portion 31 of the casing, the legs 30a, 30b and 30c of the supporting portion 30, the bolts 90a, 90b l and 90c (not shown), the intake pipe 1 and the battery cathode.

At this time, the heating element 4 instantaneously generates heat to reach about 120° C. to 150° C., the Curie temperature thereof, and the heat is transmitted to the heating plate portion 31.

The heat which is transmitted to the heating plate portion 31 is then transmitted to the three legs 30a, 30b and 30c.

In the fuel evaporator of the third embodiment, the total cross sectional area of the supporting portion 30 composed of three legs 30a, 30b and 30c is smaller than that of the cylindrical supporting portion 32 of the first and the second embodiment. Therefore, the heat quantity escaping from the heating plate portion 31 to the legs 30a, 30b and 30c is smaller than that of the first and the second embodiments.

Furthermore, since the legs 30a, 30b and 30c are covered with the adiabatic member 35, the heat of the legs 30a, 30b and 30c escapes only through the bolts 90a, 90b and 90c (not shown) which connect the flange portions 301a, 301b and 301c of the legs 30a, 30b and 30c and the intake pipe 1.

Therefore, the heat escaping into the intake pipe 1 is very small, and the heating plate portion 31 receives almost all the heat transmitted from the heating element 4 to heat the fuel droplets effectively.

Since within the covering member 35, the legs 30a, 30b and 30c are buried as a core member, sufficiently high strength can be obtained.

In several minutes after the engine is started, the temperature of the cooling water which is charged within the water jacket rises to a temperature above 80° C. At this time, the electric current can be stopped from flowing into the heating element 4.

In the third embodiment as described above, the heating plate portion 31 of the casing 3 and the legs 30a, 30b and 30c are integrally formed.

Figure 6:
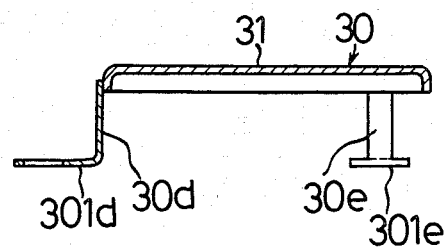
FIG. 6 is a longitudinal sectional view of a casing used in a fourth embodiment.

In the fourth embodiment as shown in FIG. 6, three legs 30d, 30e and 30f (30f is not shown) are made of an aluminum plate, respectively. These legs 30d, 30e and 30f and the heating plate portion 31 are formed separately. The supporting portion 30 of the casing 3 is produced by welding these legs 30d, 30e and 30f to the heating plate portion 31. These legs 30d, 30e and 30f are made thinner than the heating plate portion 31 and narrower in width than those of the third embodiment as shown in FIG. 5.

The flange portions 301d, 301e, and 301f which are formed in ends of the legs 30d, 30e and 30f have a width required for seating the bolts.

Other structures of the fuel evaporator of the fourth embodiment are substantially the same as those of the third embodiment.

By providing the legs as described above, the heat is further prevented from escaping from the heating plate portion 31 to the supporting portion 3.

The fuel evaporators of the third and the fourth embodiments of the present invention have the same operation effects as those of the first and the second embodiments.

Further, according to the third and fourth embodiments, by forming the supporting portion into a plurality of thin and narrow legs, the heat capacity of the casing can be reduced and the temperature thereof can be increased more rapidly.

Also, the quantity of the heat escaping from heating element can be further decreased.

As described above, according to the fuel evaporator of the present invention, the heat of the PTC ceramic heating element is effectively used for heating the heating plate portion of the casing, since the casing is electrically cut off from the intake pipe.

By forming the supporting portion of the casing into a plurality of separate thin legs, the heat transmitted from the heating element is concentrated in the heating plate portion and the fuel droplets coming in contact therewith can be effectively evaporated.

Furthermore, since the metallic supporting portion of the casing is fixed to the intake pipe by means of the bolts, the casing does not come out of the intake pipe when subjected to the intake pipe negative pressure and the ground system of the electric circuit can be made simple.

Having now fully described the invention, it will be apparent to one of ordinary skill in the art that many changes and modifications can be made thereto without departing from the spirit or scope of the invention as set forth herein.

What is claimed is:

1. A fuel evaporator disposed in a wall of an intake pipe of an internal combustion engine comprising:
a metallic casing composed of a heating plate portion and an integrally formed supporting portion composed of a plurality of strip shaped legs which project downwardly in a direction perpendicular to said heating plate portion, respectively, at predetermined intervals from the outer periphery of said heating plate portion and outwardly at the lower ends thereof to form flange portions;

said supporting portion being inserted in a hole provided in said wall of said intake pipe so that said heating plate portion is exposed to the interior of said intake pipe;

said flange portions being fixed to an outer wall of said intake pipe;

a heating element composed of a ceramic having a positive temperature coefficient of resistance, which is fixed to said heating plate portion within said casing;

a cylindrical covering member, made of insulating and adiabatic material which is tightly fitted in said hole of said intake pipe, for covering said supporting portion of said casing with said legs being buried within said covering member; and means for electrically connecting said heating element to an electric power source.

2. A fuel evaporator disposed in a wall of an intake pipe of an internal combustion engine comprising:

a metallic casing composed of a heating plate portion and a separately formed supporting portion composed of a plurality of strip shaped legs of which thickness is smaller than that of said heating plate portion, said plurality of strip shaped legs being welded to the outer periphery of said heating plate portion so as to project downwardly in a direction perpendicular to said heating plate portion, respectively, at predetermined intervals, and outwardly at the lower ends thereof to form flange portions;

said supporting portion being inserted in a hole provided in said wall of said intake pipe so that said heating plate portion is exposed to the interior of said intake pipe;

said flange portions being fixed to an outer wall of said intake pipe;

a heating element composed of a ceramic having a positive temperature coefficient of resistance, which is fixed to said heating plate portion within said casing;

a cylindrical covering member, made of insulating and adiabatic material which is tightly fitted in said hole of said intake pipe, for covering said supporting portion of said casing with said legs being buried within said covering member; and means for electrically connecting said heating element to an electric power source.

3. A fuel evaporator according to claim 1 or 2, wherein
said covering member is provided with an outwardly directed flange portion at a lower end thereof to be fixed to said outer wall of said intake pipe together with said flange portions of said casing.

4. A fuel evaporator according to claim 1 or 2, wherein
an inner wall of said intake pipe which defines said hole slightly projects inward for engagement with an upper end of said covering member.

5. A fuel evaporator according to claim 1 or 2, wherein
said flange portions of said casing are fixed to the outer wall of said intake pipe through an electric insulating member by means of a plurality of metallic bolts.

6. A fuel evaporator according to claim 1 or 2, wherein
said casing is formed of an aluminum plate.

7. A fuel evaporator according to claim 1 or 2, wherein
said heating element is formed of sintered semiconductive barium titanate.

8. A fuel evaporator according to claim 1 or 2, wherein
said covering member is formed of one of ceramic, rubber and synthetic resin materials.

9. A fuel evaporator according to claim 1 or 2, wherein
said heating plate portion is disposed in a hole of said intake pipe so as to be positioned directly under a carburetor of the internal combustion engine.

* * * * *